W. F. COCHRANE.
Grain Husker and Separator.

No. 37,125.

Patented Dec. 9, 1862.

Witnesses:
J. Snowden Bell
Wm. C. Baldwin

Inventor:
William F. Cochrane

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN GRAIN THRASHERS AND SEPARATORS.

Specification forming part of Letters Patent No. 37,125, dated December 9, 1862.

*To all whom it may concern:*

Be it known that I, WILLIAM F. COCHRANE, of Springfield, in the county of Clark and State of Ohio, have invented certain new and useful Improvements in Machinery for Thrashing and Separating Grain, (Division A, of which the following is a full, clear, and exact description of the same, reference being had to the accompanying drawings, which make part of this specification, and in which—

Figure 1:
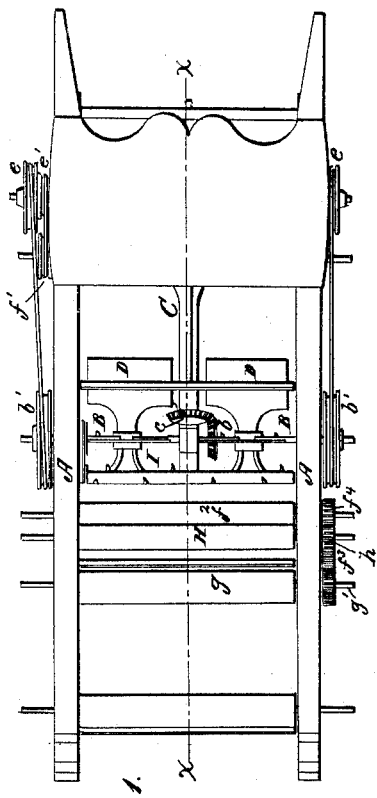
Figure 2:
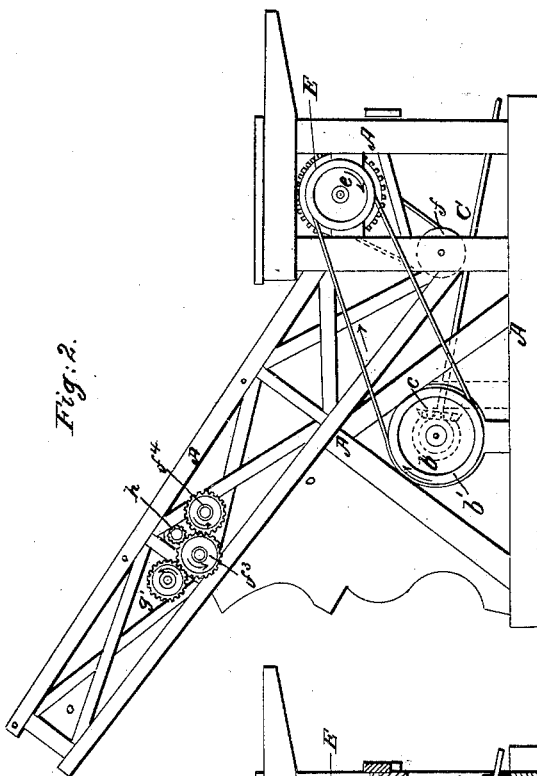
Figure 3:
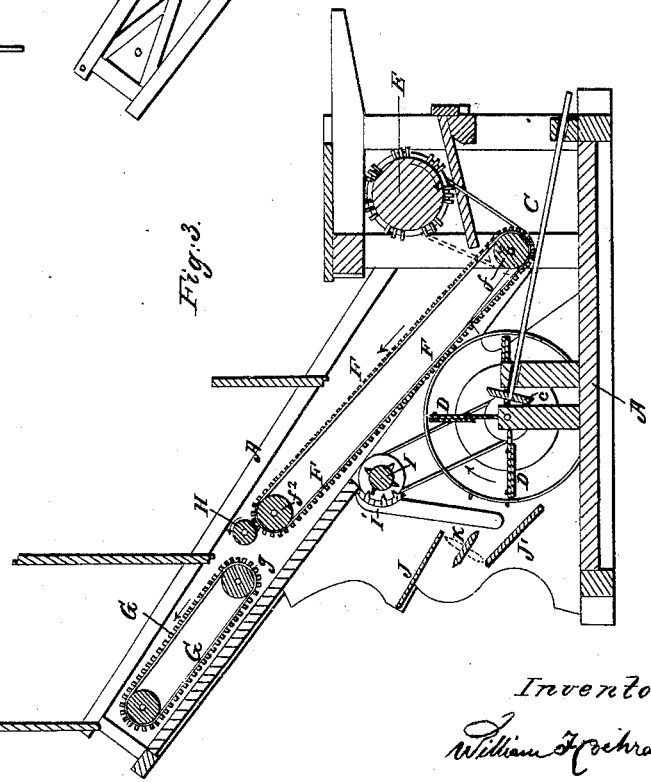

Figure 1 represents a plan or top view of a thrasher and separator embracing my improvements, the grain-belt and straw-carrier (together with a portion of the framing) being removed in order to display the mechanism more clearly. Fig. 2 represents a view in elevation of one side of the same. Fig. 3 represents a vertical longitudinal section through the same at the line $x\,x$ of Fig. 1, the grain-belt and straw-carrier being shown in position.

My invention relates to that class of machines in which the grain is thrashed, separated from the straw, and winnowed at one continuous operation, and has for its object the production of a machine which shall be simple in construction, comparatively inexpensive to manufacture, efficient in operation, and capable of being driven with a small expenditure of power; to which ends the improvements claimed under this patent consist, first, in mounting the blades or floats of the fan directly upon the cross-shaft or counter-shaft from which the remainder of the mechanism is driven, thereby dispensing with an independent fan-shaft and much of its attendant mechanism; secondly, in dividing the blades or floats of the fan in such manner that the driving or line shaft may pass between them, in order to drive the counter-shaft from a point near its center, whereby the mechanism is preserved from torsion and strain, and thus caused to run smoothly; thirdly, in driving the thrashing-cylinder directly from the fan-shaft, whereby the construction of the machine is simplified and its effectiveness increased.

In the accompanying drawings, which represent a convenient arrangement of parts for carrying out the objects of my invention, the mechanism is represented as supported in a stout frame, A. A counter-shaft, B, turns in suitable bearings near the rear end of this frame. A line or driving shaft, C, extends lengthwise of the frame. One end of this shaft connects directly with the prime mover, while the other carries a bevel-wheel, $c$, which gears into a corresponding pinion, $b$, on the counter-shaft. The fan, in this instance, is composed of floats or vanes D, mounted directly upon the counter-shaft, and inclosed in a suitable casing. It is composed of two distinct sets of blades or floats, placed sufficiently far apart on the shaft to permit them to revolve freely with it without their ends coming in contact with the line-shaft or its bearings, which arrangement is clearly shown in Figs. 1 and 3 of the drawings. The thrashing-cylinder E is driven by bands or cords encircling pulleys $b'$ on each end of the counter-shaft, and corresponding ones, $e$, on the cylinder-shaft, as shown in Fig. 1. The red arrows indicate the direction of the movements of the several parts.

The advantages attained by my improvements are, that by mounting the blades of the fan directly upon the counter-shaft I dispense with an independent fan shaft and its gearing. By driving it from the center the mechanism runs more smoothly, while by driving the thrashing-cylinder from the fan-shaft I render the machine more compact, and run it with less expenditure of power, all of which advantages will readily be appreciated by practical men.

I deem it unnecessary here to describe in detail the construction, arrangement, and operation of the other parts of the machine, as they form no part of the subject-matter herein claimed, and, besides, are fully described in an application filed simultaneously with this, and marked "Division B."

It is obvious that the construction of the fans might be modified in various ways without departing from the spirit of my invention, which modifications would readily occur to a skillful mechanic on reading this description,

What I claim under this patent as my invention is—

1. Mounting the fans directly upon the cross-shaft or counter-shaft from which the remainder of the mechanism is driven, substantially in the manner described, for the purposes set forth.

2. The combination of the line-shaft, counter-shaft, and fans, substantially as and for the purpose described.

3. Driving the thrashing-cylinder directly from the fan-shaft, substantially in the manner described.

In testimony whereof I have hereunto subscribed my name.

WILLIAM F. COCHRANE.

Witnesses:
WM. WARDER,
JOHN H. WARDER.